UNITED STATES PATENT OFFICE.

FERDINAND D. OWEN, OF JOPLIN, MISSOURI.

IMPROVEMENT IN SUPPOSITORIES.

Specification forming part of Letters Patent No. 199,221, dated January 15, 1878; application filed November 27, 1877.

*To all whom it may concern:*

Be it known that I, FERDINAND D. OWEN, of Joplin, in the county of Jasper and State of Missouri, have invented a new and Improved Medicated Suppository, of which the following is a specification:

My invention relates to a suppository for the relief and cure of prolapsus uteri and other diseases of the womb and vagina, composed of slippery-elm bark, pulverized sassafras-bark, balsam copaiva, Dover's powders, and extract of valerian.

To prepare the suppository, I take equal parts of slippery-elm bark, pulverized sassafras-bark, Dover's powders, and extract of valerian, and mix them together thoroughly, and form them into a cup-shaped suppository, which is allowed to dry, when it may be used in the same manner as the ordinary pessary-cup is used.

The slippery elm forms the base which holds together the other ingredients, and has the soothing effect of a slippery-elm poultice. The sassafras relieves the vagina of hot acrid secretions. The balsam copaiva reduces inflammation, and the Dover's powders and valerian afford temporary relief from pain.

The suppository acts as a mechanical supporter, and at the same time affords the required remedial agent.

Having thus described my invention, I claim as new and desire to secure by Letters Patent—

A suppository of a cup shape, composed of slippery-elm bark, sassafras-bark, balsam copaiva, Dover's powders, and extract of valerian, combined in the proportions herein specified.

FERDINAND D. OWEN.

Witnesses:
B. F. GARRISON,
R. A. BUCKNER.